United States Patent

[11] 3,593,175

[72] Inventors T. O. Paine
Deputy Administrator of the National Aeronautics and Space Administration with respect to an invention of;
William J. Kerwin, 1981 Shalimar Way Tucson Ariz. 85704; Charles V. Shaffer, 3425 N.W. 8th Ave., Gainsville, Fla.

[21] Appl. No. 33,159
[22] Filed May 8, 1970
[45] Patented July 13, 1971
Continuation of application Ser. No. 751,265, Aug. 8, 1968, now abandoned.

[54] ACTIVE RC NETWORKS
5 Claims, 9 Drawing Figs.

[52] U.S. Cl. .......... 330/107, 330/109
[51] Int. Cl. .......... H03f 1/36
[50] Field of Search .......... 330/21, 31, 26, 28, 38, 38 M, 107, 109; 331/135—137, 140, 142; 333/70 R

[56] References Cited
UNITED STATES PATENTS

| | | | |
|---|---|---|---|
| 2,459,046 | 1/1949 | Rieke .......... | 330/109 |
| 3,116,460 | 12/1963 | Nowlin .......... | 330/109 X |
| 2,783,373 | 2/1957 | Fowler .......... | 330/109 X |
| 3,148,344 | 9/1964 | Kaufman .......... | 333/70 |
| 3,212,020 | 10/1965 | Donovan et al. .......... | 330/38 |
| 3,436,669 | 4/1969 | Russell et al. .......... | 330/109 X |

OTHER REFERENCES

Dahlem, " Industrial Applications of Linear TCS," THE ELECTRONIC ENGINEER June, 1967, pp. 72— 77, (330-35 D)

Kaufman (II), " Theory of a Monolithic Null Device and Some Novel Circuits," PROCEEDINGS OF THE IRE, Sept. 1960, pp. 1540— 1545, (330-38 MI)

Price et al., " A Tunable Solid-Circuit Filter Suitable For an I.F. Amplifier," ELECTRONIC ENGINEERING, Dec. 1963, pp. 806— 812, (330-109)

*Primary Examiner*—Roy Lake
*Assistant Examiner*—James B. Mullins
*Attorneys*—G. T. McCoy and Darrell G. Brekke

ABSTRACT: An active RC network formed by a voltage amplifier and a passive RC feedback network connected in a negative feedback loop with the amplifier. The negative feedback network is able to receive a resistance such that when the resistance is zero, there are no zeros in the transmission of the feedback network (phantom zeros), and when the resistance is finite, there are complex conjugate phantom zeros in the right half of the complex frequency plane. For any given value of the quality factor Q of the network response, both the required amplifier gain and the sensitivity of the circuit to gain and component changes are small, with the value of the phantom-zero-determining resistance being selected to achieve a desired trade-off between the values of the gain and the sensitivity. In certain embodiments, the passive RC network includes a distributed RC element in which the resistive portion of the distributed element is connected between the output and input of the voltage amplifier. If the amplifier is a simple voltage amplifier, the phantom-zero-determining resistance is connected in series between the network input terminals and the conductive portion of the distributed element. This conductive portion may also be divided into one or more parts connected to the common connection between the input and output of the network, thereby improving the selectivity by introducing a zero at infinity. If the amplifier is a differential amplifier, the phantom-zero-determining resistance is connected in series between the conductive portion of the distributed element and the input-output common connection.

INVENTORS.
WILLIAM J. KERWIN
CHARLES V. SHAFFER
BY
ATTORNEYS

INVENTORS.
WILLIAM J. KERWIN
CHARLES V. SHAFFER
BY
ATTORNEYS

ACTIVE RC NETWORKS

This application is a continuation of application Ser. No. 751,265 filed Aug. 8, 1968 and now abandoned.

The invention described herein was made in the performance of work under a NASA contract and is subject to the provisions of section 305 of the National Aeronautics and Space Act of 1958, Public Law 850568 (72 Stat. 435; 42 U. S. C. 2457).

BACKGROUND OF THE INVENTION

An active RC network may be defined as a circuit containing resistors, capacitors and an active element, such as an amplifier, which interact to provide a characteristic transfer function for relating the output of the circuit to the input of the circuit. It is most significant that such networks are able to achieve the same transfer functions as passive RLC networks, but without the necessity of including inductance in the circuit. The elimination of inductive components from the circuit has many advantages. If the circuit is manufactured in the form of an integrated or monolithic circuit, it is not practical to provide inductive elements. For example, the size and weight of inductive components may be undesirable in many applications. In applications such as the measurement of weak magnetic fields, the magnetic effects of inductive elements may be undesirable.

The usual approach to the design of active RC networks is to consider a general transfer function T ($p$) relating the output of network to the input of the network, where $p$ is the complex frequency variable $\sigma+j\omega$, as being factored into a product of complex root quadratics and first degree terms. Each quadratic factor is realized by an active RC network, and the first degree term or terms are realized by passive RC networks. The desired overall response T($p$) is then realized by connecting these individual subnetworks in cascade. The following description is particularly directed to active RC networks having such a quadratic response, characterized in general by a pair of complex conjugate zeros (values of $p$ at which the numerator of the quadratic factor is zero) and a pair of complex conjugate poles (values of $p$ at which the denominator of the quadratic factor is zero). It is to be understood, however, that such a quadratic response network may be used as a subnetwork in developing an overall cascaded response in accordance with well-known network design techniques. In the case of networks containing distributed elements which do not have a rational transfer function, we refer to the equivalent poles and zeros, that is, the quadratic factor whose amplitude response versus frequency most closely approximates that of the distributed system.

One object of the present invention is the provision of a new form of active RC network.

Another object of the present invention is the provision of an active RC network with a quadratic response and capable of being connected in cascade to achieve a desired overall response.

Another object of the present invention is the provision of an active RC network of simple and reliable design. Still another object of the present invention is the provision of an active RC network characterized by a high value of the response sharpness factor Q and by low amplifier gain, whereby operation may be extended into high frequency regions.

Previous forms of active RC networks are known in which the active element is a relatively simple voltage controlled voltage source (DC amplifier) with positive feedback. Such networks are disclosed, for example, in an article by W. J. Kerwin entitled "An RC Active Elliptic Function Filter" published in the 1966 *IEEE Region Six Conference Record*, vol. 2, Apr. 1966 pages 648—654 and in an article by W. J. Kerwin entitled "Synthesis of Active RC Networks Containing Distributed and Lumped Elements" and published in *Proceedings of the first Annual Asilomar Conference on Circuits and Systems*, Nov. 1967. These prior networks are quite satisfactory for relatively low values of Q (quality factor of frequency response); however, for Q values in excess of 10, for example, they exhibit an undesirably high sensitivity to both changes in amplifier gain and changes in the values of the passive RC components. One approach to the reduction of such sensitivity, described, for example, in an article by S. S. Hakim entitled "Synthesis of RC Active Filters with Prescribed Pole Sensitivity" published in the *IEE Proceedings*, Volume 112 , No, 12, Dec. 1965, is to use a negative feedback amplifier as the active element in combination with a passive feedback circuit which exhibits zero transmission ("phantom zeros") at complex frequencies in the left half of the complex frequency plane. That is, the transfer function T($p$) of the feedback circuit is zero for complex conjugate values of the complex frequency variable $p=\sigma+j\omega$ at which the real part $\sigma$ is a negative number or zero. This approach, however, requires an undesirably large amplifier gain, so that, for example, the maximum frequency obtainable with simple amplifiers is restricted, and also requires an undesirably large number of passive elements.

Accordingly, a more specific object of the present invention is the provision of an active RC network capable of operating at high Q values with reduced sensitivity to changes in the gain of the voltage amplifier and to changes in the values of the passive components, and characterized by a reduction in both amplifier gain and the number of passive components because of the positioning of the phantom zeros in the right half plane and/or the use of distributed elements and lumped elements.

SUMMARY OF THE INVENTION

Generally speaking, the present invention attains these objects by the provision of an active RC network, comprising: a voltage amplifier; and a passive RC feedback loop for feeding a negative feedback signal from the output of said voltage amplifier to the input thereof, said feedback network being able to receive a resistive impedance therein such that there are no zeros in the transmission of said feedback network when said resistive impedance is essentially zero and there are complex conjugate zeros in the transmission of said feedback network, said zeros being located in the right half of the complex frequency plane, when said resistive impedance is essentially nonzero, the value of said resistive impedance serving to establish the location of said complex conjugate zeros.

DESCRIPTION OF DRAWINGS

These and other objects, features and advantages of the present invention will become more apparent upon a consideration of the following description, taken in connection with the accompanying drawing, wherein.

Figure 1:
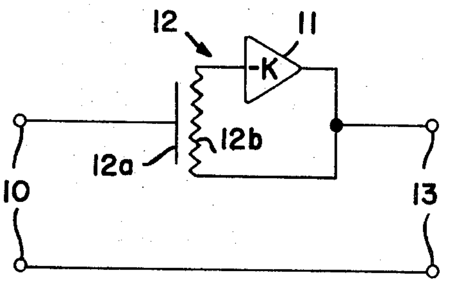
FIG. 1 is a schematic circuit diagram of an active RC network in accordance with the present invention, utilizing a voltage amplifier and a distributed RC element.

Referring to the active RC network of FIG. 1, input terminals 10 are adapted to receive an input signal which is applied to a voltage amplifier 11 via a passive RC input circuit consisting of a distributed RC line or element 12 having a conductive member 12*a* which is capacitively coupled to a resistive member 12*b*. Part of the output signal of the amplifier 11 is fed back to the input circuit through the resistive member 12*b*. The output of the amplifier 11 provides the output signal of the network at output terminals 13.

Suitable constructions for the distributed RC element 12 are disclosed in an article by D. G. Barker entitled "Synthesis of Active Filters Employing Thin Film Distributed Parameter Networks" published in the *IEEE International Convention Record*, Part 7, 1965, pages 119—126 and an article by B. B. Woo and R. G. Hove entitled "Synthesis of Rational Transfer Functions with Thin Film Distributed-Parameter RC Active Networks" published in the *Proceedings of the National Electronics Conference*, Vol. 21, 1965, pages 270—274. Such elements consist of a dielectric layer sandwiched between a highly conducting layer forming the resistive member 12*b*. These elements may be formed by standard monolithic integrated circuit techniques or thin film techniques. The element 12 may have either a uniform or variable resistance per unit length and it may have either a uniform or variable capacitance per unit length.

The voltage amplifier 11 is characterized by a gain K. The output is shifted in phase 180° with respect to the input. In FIG. 1 and the remaining figures, this particular input-output relationship is identified by a minus sign (−). A plus sign (+) is used to identify an input that is in phase with the output. Accordingly, the feedback signal, which is applied to the input circuit 12 across the resistive member 12*b*, is 180° out of phase with respect to the input signal, which is capacitively coupled through the conductive member 12*a*, so that the amplifier 11 is functioning in a negative feedback loop.

The network of FIG. 1 is characterized by a low required value K for any desired Q of the network response. This circuit is also extremely compact and simple, it being noted that the distributed element 12 occupies no more area than a single lumped capacitor. The parameters of this network may, if desired, be selected to locate a pole of the response on the positive $j\omega$ axis, in which case, the network functions as an oscillator at the frequency $\omega$ at which the pole is so located.

In one example of an active RC band-pass filter utilizing the network of FIG. 1, the center frequency was 710 kc., the Q value was 60, the voltage amplifier gain was −11.4, and the overall network gain was 1000. The sensitivity to amplifier gain change was 15 as compared to a design involving a positive gain amplifier in which such sensitivity was 150. The Q sensitivity to changes in the passive components was essentially zero.

FIG. network of Figure 1, being characterized by both a high Q and a low voltage amplifier gain, is capable of operating at high frequencies, for example, in the megahertz region.

Figure 2:
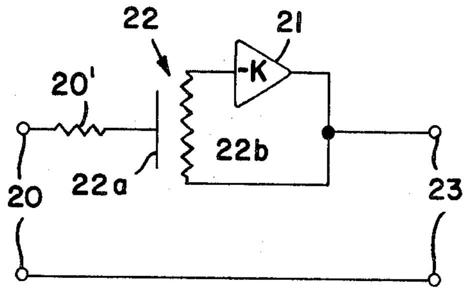
FIG. 2 is a schematic circuit diagram of an active RC network in accordance with the present invention, similar to Figure 1 but containing a phantom-zero-positioning resistor.

In the active RC network of FIG. 2, input terminals 20 are adapted to receive an input signal which is applied to a voltage amplifier 21 via a passive RC input circuit consisting of a resistor 20', in series with the input terminal 20 and conductive member 22*a*, and a distributed RC element 22 having a conductive member 22*a* which is capacitively coupled to a resistive member 22*b*. Part of the output signal of the amplifier 21 is fed back to the input circuit through the resistive member 22*b*. The output of the amplifier 21 provides the output signal of the network at output terminals 23. The voltage amplifier 21 is characterized by a gain K functioning in a negative feedback loop with the feedback signal applied to the input circuit via the resistive member 22*b* being 180° out of phase with respect to the network input signal.

The passive circuit consisting of the resistor 20' and the distributed RC element 22 is a so-called "notch" filter having complex conjugate points of zero transmission (phantom zeros) in the right half of the complex frequency $p$ plane. That is, the transfer function $T(p)$ for said passive feedback circuit is zero for complex conjugate values of the complex frequency variable $p=\sigma+j\omega$ at which the real part $\sigma$ is a positive number. The resistance value R of resistor 20' will, in general, determine the position of these phantom zeros. In the limit where R=0, the network of FIG. 2 is the same as the network of FIG. 1 and is characterized by the lowest possible value of K for a particular value of Q. For finite values of R, a phantom zero position is chosen for a particular value of Q which represents a trade off between low gain and low sensitivity to gain. As in the case of the network of FIG. 1, the parameters of the network of FIG. 2 may be chosen so as to locate a pole of the response on the positive $j\omega$ axis, thereby causing the network to function as an oscillator.

Figure 3:
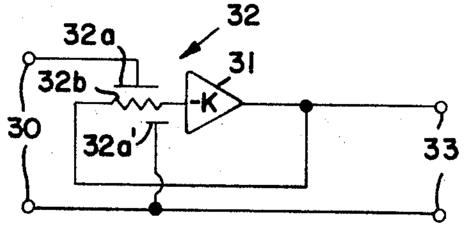
FIG. 3 is a schematic circuit diagram of an active RC network in accordance with the present invention, similar to FIG. 1 but with the conductive portion of the distributed RC element divided into two parts in order to improve the selectivity of the network.

In the active RC network of FIG. 3, input terminals 30 are adapted to receive an input signal which is applied to a negative-feedback loop voltage amplifier 31 of gain K, via a passive RC input circuit consisting of a distributed RC element 32 having two (or more) separate conductive members 32*a*, 32*a'* capacitively coupled to a common resistive member 32*b* to thereby form two (or more) separate capacitances in the distributed element 32. This additional capacitance is connected, by connection to the conductive member 32*a'*, to the common connection between the input terminals 30 and output terminals 33. The operation of the network of FIG. 3 is similar to that of FIG. 1, except that the additional capacitance connected to said common connection serves to improve the selectivity of the network.

Figure 4:
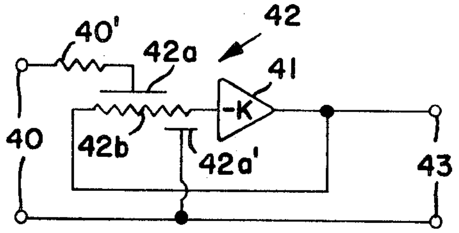
Figure 4 is a schematic circuit diagram of an active RC network in accordance with the present invention, similar to FIG. 2 but also with the conductive portion of the distributed RC element divided into two parts in order to improve the selectivity of the network.

In the active RC network of FIG. 4, input terminals 40 are adapted to receive an input signal which is applied to a negative-feedback loop voltage amplifier 41 of gain K, via a passive RC input circuit consisting of a resistor 40', in series with the input terminals 40 and conductive member 42*a*, and a distributed RC element 42 having two (or more) separate conductive members 42*a*, 42*a'* capacitively coupled to a common resistive member 42*b* to thereby form two (or more) separate capacitances in the distributed element 42. This additional capacitance is connected, by connection to the conductive member 42*a'*, to the common connection between the input terminals 40 and output terminals 43.

The passive circuit consisting of the resistor 40' and the distributed RC element 42 is a notch filter with phantom zeros in the right half complex frequency plane. The resistance value R of resistor 40' will, in general, determine the position of these phantom zeros. The operation of the network of FIG. 4 is similar to that of FIG. 2, except that the additional capacitance connected to said common connection serves to improve the selectivity of the network. In the limit where R=0, the network of FIG. 4 is the same as the network of FIG. 3, and the trade off between low gain and low sensitivity for finite R is as described above in comparing above in comparing the networks of FIGS. 1 and 2.

Figure 5:
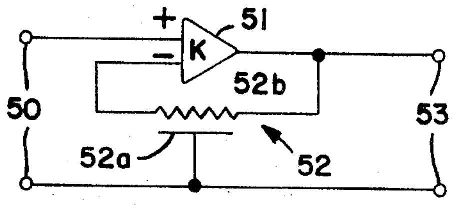
FIG. 5 is a schematic circuit diagram of an active RC network in accordance with the present invention; utilizing a differential amplifier and a distributed RC element.

Referring now to the active RC network of FIG. 5, input terminals 50 are adapted to receive an input signal which is applied to the noninverting input terminals of a voltage amplifier 51. The amplifier 51 is a differential or summing amplifier having both a positive and negative voltage input. The output of the amplifier 51 provides the output signal at output terminals 53. Part of the output signal of the amplifier 51 is fed back to the input circuit through the resistive member 52*b*. This feedback signal is applied to the negative voltage input of the differential amplifier 51, thereby establishing a negative feedback loop for the amplifier 51. The conductive FIG. 52*a* is connected to the common connection between the input terminals 50 and the output terminals 53. The operation of the network of FIG. 5 is similar to that described with reference to FIG. 1.

Figure 6:
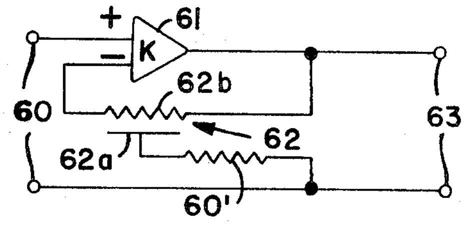
FIG. 6 is a schematic circuit diagram of an active RC network in accordance with the present invention, similar to FIG. 5 but containing a phantom-zero-positioning resistor.

In the active RC network of FIG. 6, input terminals 60 are adapted to receive an input signal which is applied to the positive input of a differential voltage amplifier 61. The other input is connected to a passive RC circuit consisting of a distributed RC element 62 having a conductive member 62*a* which is capacitively coupled to a resistive member 62*b* and a resistor 60′ which is connected in series between the conductive member 62*a* and the common connection between the input terminals 60 and output terminals 63. Part of the output of the amplifier 61 is fed back through the resistive member 62*b* to the negative input of the amplifier 61, thereby establishing a negative feedback loop for said amplifier.

The passive network consisting of the resistor 60′ and the distributed RC element 62 is a notch filter with phantom zeros in the right half complex frequency plane. The resistance value R of resistor 60′ will, in general, determine the position of these phantom zeros. The operation of the network to FIG. 6 is similar to that of FIG. 2. In the limit where R=0, the network of FIG. 6 is the same as the network of FIG. 5, and the trade off between low gain and low sensitivity for finite R is as previously described in comparing the networks of FIGS. 1 and 2.

Figure 7:
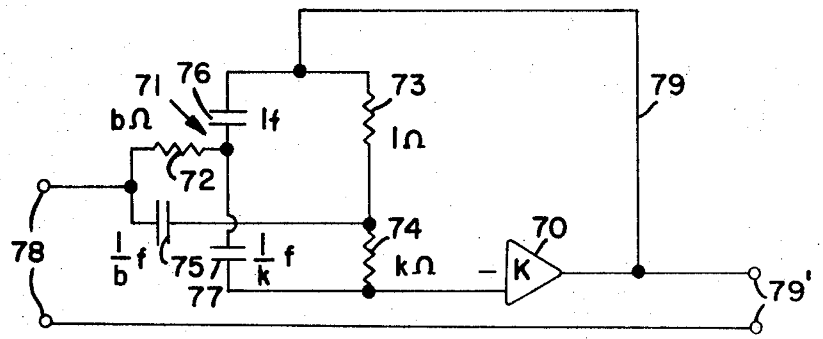
FIG. 7 is a schematic circuit diagram of an active RC network in accordance with the present invention, utilizing a voltage amplifier and a lumped RC network.

Illustrated in FIG. 7 is a voltage amplifier 70. Connected to the input side of the voltage amplifier 70 is a twin-T lumped RC network 71 comprising resistors 72—74 and capacitors 75—77. Input terminals 78 are adapted to receive an input signal, which is applied to the voltage amplifier 70 through the lumped RC input network 71.

Interconnecting the output side of the voltage amplifier 70 and the lumped RC network 71 is a negative feedback loop 79 so that part of the output signal of the amplifier 70 is fed back to the input of the amplifier 61 through the network 71. The output of the amplifier 70 provides the output for the RC active network at output terminals 79′.

The operation of the active RC network shown in FIG. 7 is similar to FIG. 6 with the lumped RC input network instead of the distributed RC element and is also similar in operation to the active RC network illustrated in FIG. 2.

The Transfer function $T(p)$ for the active RC network shown in FIG. 7 is as follows:

$$T(p) = -\left(\frac{K}{1+K}\right)\left(\frac{(\beta-\alpha)P}{P^2+\frac{\beta+\alpha K}{1+K}P+1}\right)$$

where $\alpha$ is:

$\alpha = b+\frac{b}{k}-1$, where $b$, $k$ are shown in FIG. 7, and $k$ is the gain of the amplifier 70, and $\beta$ is:

$\beta = b+\frac{b}{k}+\frac{1}{k}+\frac{1}{b}$, where $b$, $k$ are shown in FIG. 7.

In the above formula $p$ is equal to the complex variable $\sigma+j\omega$.

By selecting appropriate values for $b$ and $k$, the zeros can be placed wherever desired in the right half plane (RHP) that is any value of $\alpha$ can be obtained. The pole position finally obtained is determined by the value $K$, which is the selected value for the gain of the amplifier 70. To have the zeros located in the RHP, $\alpha$ is negative.

Figure 8:
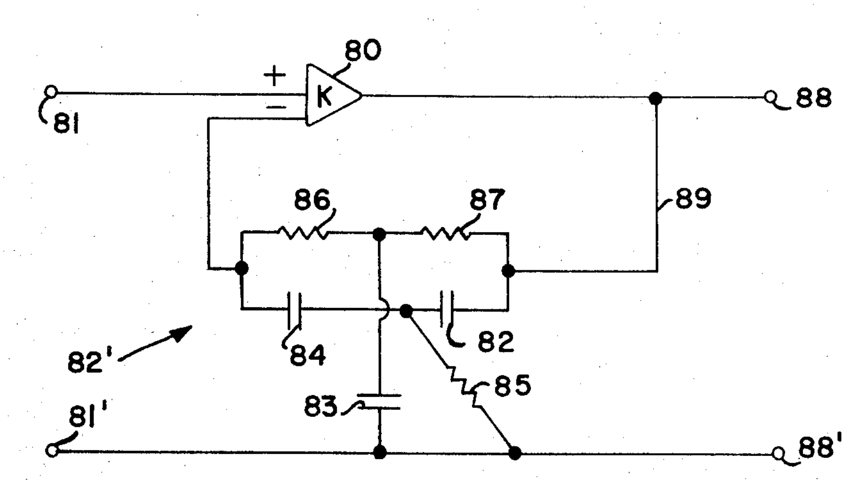
FIG. 8 is a schematic circuit diagram of an active RC network in accordance with the present invention, utilizing a differential amplifier and a lumped RC network.

In FIG. 8, the active network thereof comprises a differential amplifier 80. An input terminal 81 is connected to the positive side of the input of the amplifier 80 and an input terminal 81′ is connected to the negative side of the input of the amplifier 80 through a twin-T lumped RC network 82′. The lumped RC network 82′ includes capacitors 82—84 and resistors 85—87. An output signal for the active RC network of FIG. 8 is taken across terminals 88 and 88′. A part of the output signal is fed back to the input of the differential amplifier 80 via a negative feedback loop 89.

The operation of the active RC network of FIG. 8 is similar to the operation of the active RC network illustrated in FIG. 5.

Figure 9:
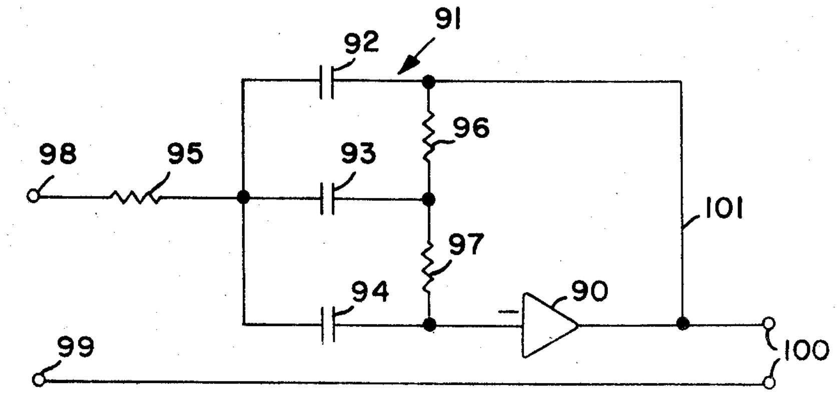
Figure 9 is a schematic circuit diagram of an active RC network in accordance with the present invention employing an amplifier and a different lumped RC network.

The active RC network shown in FIG. 9 includes a phase inverting amplifier 90. Connected to the input side of the amplifier 90 is a lumped RC network 91, which includes capacitors 92—94 and resistors 95—97.

An input signal is applied across terminals 98 and 99. The input terminal 98 is connected to the lumped network 91 and the input terminal 99 is common to one of the output terminals 100. Across output terminals 100 is taken the output signal of the active RC network shown in FIG. 9. A negative feedback loop 101 interconnects the output of the amplifier 90 with the input lumped RC network 91.

By employing the capacitors 92—94 and the resistors 95—97, a "notch" filter is achieved, which when combined with amplifier 90 results in a band-pass filter. In operation, the active RC network illustrated in FIG. 9 is similar to the operation of the active RC network shown in FIG. 2.

It is to be understood that modifications and variations of the embodiments of the invention disclosed herein may be resorted to without departing from the spirit of the invention.

Having thus described out invention, what we claim as new and desire to protect by Letters Patent is:

1. An active RC network having an adjustable amplifier gain to Q-sensitivity-to-gain-change ratio comprising first and second input terminals, first and second output terminals, a negative-gain voltage amplifier with an input and an output, a right-half-plane phantom-zero passive RC network comprising a resistor and a distributed RC network, said RC network having a capacitive element with a single terminal and a two-terminal resistive element, said resistor being connected between said first input terminal and said terminal of said capacitive element, said terminals of said resistive element being connected to said amplifier input and said amplifier output, respectively, said amplifier output being connected to said first output terminal, said second input terminal being connected to said second output terminal, said ratio being a function of the resistance of said resistor.

2. An active RC network having a passive RC network with movable right-half-plane phantom zeros comprising first and second input terminals, first and second output terminals, a negative-gain voltage amplifier, a distributed RC network having a capacitive element with a single terminal and a two-terminal resistive element, said terminals of said resistive element being connected to said amplifier input and said amplifier output, respectively, said resistive element providing a feedback loop for said amplifier, a phantom-zero-determining resistance coupled between said first input terminal and said terminal of said capacitive element, the position of said zeros in said right-half plane being a function of the magnitude of said resistance, said amplifier output being coupled to said first output terminal, and said second input terminal being connected to said second output terminal.

3. An active RC network comprising: first and second input terminals, first and second output terminals, said second input terminal being connected to said second output terminal, a negative-gain voltage amplifier having an input and an output, said amplifier output being connected to said first output terminal, a passive RC network comprising a distributed RC element and a resistor, said RC element comprising two capacitive members and a resistive member, said resistor being connected between said first input terminal and one of said capacitive members, said other capacitive member being connected to said second input terminal, said resistive member being connected between said amplifier input and said amplifier output, said passive RC network having a transfer function with zeros of transmission in the right half of the complex frequency plane, the position of said zeros in said right half of said plane being a function of the resistance of said resistor, the trade off between amplifier gain and Q-sensitivity-to-gain change being a result of the position of said zeros in said right half of said complex frequency plane.

4. An active RC network having a passive RC network with movable right-half-plane phantom zeros comprising first and second input terminals, first and second output terminals, a negative-gain voltage amplifier having an input and an output, a passive RC network, said passive RC network comprising first, second and third resistors, and first, second and third capacitors, said second input terminal being connected to said second output terminal, said amplifier output being connected to said first output terminal, said first and second resistors being connected in series with each other and jointly connected in shunt with said input and said output of said amplifier, said third resistor and said first capacitor being connected in series between said first input terminal and the junction of said first and second resistors, said second capacitor being connected between said amplifier input and the node of said third resistor and said first capacitor, said third capacitor connected between said amplifier output and the node of said third resistor and said first capacitor, the position of said phantom zeros being a function of the resistance of said third resistor.

5. An active RC network comprising: first and second input terminals, first and second output terminals, a negative-gain voltage amplifier having an input and an output, a passive RC network comprising first, second and third capacitors and first, second and third resistors, said first and second resistors being connected in series between said amplifier output and said amplifier input, said first and second capacitors being connected in series with each other and jointly in shunt with said first and second resistors, said third resistor being connected between said first input terminal and the node of said first and second capacitors, said third capacitor being connected between said first input terminal and the node of said first and second resistors, said output of said amplifier being connected to said first output terminal, said second input terminal being connected to said second output terminal, the transfer function for said active RC network being $$T(p) = -\frac{k}{1+k}\,\frac{(\beta-\alpha)p}{p^2+\frac{\beta+\alpha k}{1+k}p+1}$$

where $\alpha = b + (b/k) - 1$, $\alpha$ is negative, $\beta = b + \frac{b}{k} + \frac{1}{k} + \frac{1}{b}$ $p = \sigma + j\omega$, $K$ = amplifier gain, and the normalized values of the resistors and capacitors are as follows:

first resistor = $1\Omega$ second resistor = $k\Omega$ third resistor = $b\Omega$ first capacitor = 1 farad second capacitor = $\frac{1}{k}[f]$ farad third capacitor = $\frac{1}{b}[f]$ farad